US009003049B1

(12) United States Patent
Simoes

(10) Patent No.: US 9,003,049 B1
(45) Date of Patent: Apr. 7, 2015

(54) INTERACTIVE VOICE RESPONSE OBJECT

(75) Inventor: Renato Simoes, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 1461 days.

(21) Appl. No.: 12/128,433

(22) Filed: May 28, 2008

Related U.S. Application Data

(60) Provisional application No. 61/024,124, filed on Jan. 28, 2008, provisional application No. 61/044,253, filed on Apr. 11, 2008.

(51) Int. Cl.
*G06F 15/16* (2006.01)
*H04M 3/51* (2006.01)
*H04L 29/06* (2006.01)

(52) U.S. Cl.
CPC ......... *H04M 3/5166* (2013.01); *H04L 65/1006* (2013.01)

(58) Field of Classification Search
CPC ........................ H04M 3/5166; H04L 54/1006
USPC ......................................................... 709/230
See application file for complete search history.

(56) References Cited

U.S. PATENT DOCUMENTS

| 2003/0083882 | A1* | 5/2003 | Schemers, III et al. ..... 704/270.1 |
| 2003/0120502 | A1* | 6/2003 | Robb et al. ......................... 705/1 |
| 2004/0148332 | A1* | 7/2004 | Parolkar et al. ................ 709/200 |
| 2006/0109976 | A1* | 5/2006 | Sundaram et al. ........ 379/265.02 |
| 2006/0245391 | A1* | 11/2006 | Vaidya et al. ................... 370/329 |
| 2007/0041525 | A1* | 2/2007 | Tingley et al. ............. 379/88.17 |
| 2007/0081520 | A1* | 4/2007 | Da Palma et al. ............. 370/352 |
| 2008/0084989 | A1* | 4/2008 | Dhanakshirur ............... 379/309 |
| 2008/0086564 | A1* | 4/2008 | Putman et al. ................ 709/227 |

* cited by examiner

*Primary Examiner* — Krista Zele
*Assistant Examiner* — James Forman
(74) *Attorney, Agent, or Firm* — Sheridan Ross P.C.

(57) ABSTRACT

Methods, devices, and systems for creating and using an interactive voice object are provided. An alternative way of providing Interactive Voice Response (IVR) capabilities to a Session Initiation Protocol (SIP) endpoint is described. More specifically, the present invention allows the SIP endpoint to have its SIP signaling controlled by an application running in a SIP application server.

20 Claims, 7 Drawing Sheets

INTERACTIVE VOICE RESPONSE OBJECT

CROSS REFERENCE TO RELATED APPLICATIONS

This Application claims the benefit of U.S. Provisional Application Nos. 61/024,124, filed Jan. 28, 2008, and 61/044,253, filed Apr. 11, 2008, the entire disclosures of which are hereby incorporated herein by reference.

FIELD OF THE INVENTION

The invention relates generally to alternative ways of controlling user interactions with a media server.

BACKGROUND

There are typically three components required for an application hosted in a Session Initiation Protocol (SIP) application server to request Interactive Voice Response (IVR) capabilities to a SIP endpoint. The first component is the SIP application server itself. This is where the application logic (composed of business logic and signaling handling) is deployed. The second component is the media server. The media server is the location where IVR commands are interpreted and executed, the appropriate prompts are played, Dual Tone Multi-Frequency (DTMF) signals are collected, and audio are recorded. The third component is the web server. This particular component is used as a repository of prompts as well as a repository of the web pages that will generate VoiceXML, if necessary.

Currently there are two different alternatives available to support IVR capabilities such as: a) playing a prompt; b) collecting DTMF input from the SIP endpoint via the phone keypad; and c) recording the SIP endpoint audio/voice into a file. Each of these alternatives will be discussed in turn.

The first alternative that is used to achieve IVR capabilities in a SIP environment is to employ a Media*Markup Language (M*ML) enabled media server. M*ML refers to the different types of media servers that can be used to support different Markup Languages (MLs). For a Snowshore media server, the Media Server Control Markup Language (MSCML) is used. For a Convedia media server, a combination of Media Object Markup Language (MOML) and Media Sessions Markup Language (MSML) is used. In either case, the term M*ML is been used here to generalize the above possibilities/combination.

M*ML is then some Extensible Markup Language (XML) scripting language that is embedded in the SIP messages that are exchanged between the SIP application server and the media server. These XML messages provide a way of defining a protocol within the SIP protocol to achieve the IVR capabilities. SIP INFO messages and the 200-OK (for the INFO message) is used to carry this XML payload.

In this particular alternative, the web server is used as prompt repository (and for some installations it can also be substituted for a file server). There are, however, several disadvantages to using the M*ML solutions to provide IVR capabilities. Namely, the M*ML is highly complex. Although it is quite powerful (as it supports non-IVR functionality), it is overly complex if the only target functionality is to provide IVR capabilities. This makes the application hosted in the SIP application server difficult to be coded as it has to parse and format this M*ML embedded within the SIP messages.

Another drawback to the M*ML alternative is that M*ML represents different XML formats, and this difference infers portability issues. Meaning, an application that uses MSCML is written to run on the Snowshore media server only, and cannot run on a Convedia one. Additionally, the number of media servers that support M*ML is smaller than the number that support VoiceXML (the second currently available alternative to provide IVR capabilities).

Still another drawback to the M*ML alternative is that "corner cases" present a significant challenge when attempting to stabilize (i.e., debug) an application hosted in a SIP application server. Corner cases are common in SIP-based applications due the asynchronous nature of the SIP messages. This causes messages to come from any SIP endpoint at any time and the messages can cross each other. All of this makes the number of possible combinations that need to be handled quite challenging for a developer. Thus, the less SIP signaling that occurs in the system, the easier it is to make an application stable. This is not the case for M*ML which relies heavily on the INFO message to support IVR capabilities. As an example, a simple request for playing a prompt produces 4 messages (illustrated here with plain English instead of M*ML for easier reading): a) "play this prompt" (from SIP application server to media server in a INFO message); b) "yes I will play" (in the 200-OK message, from the media server back to SIP application server); c) "prompt has been played" (in a INFO message from the media server to SIP application server); and d) "thank you" (in the 200-OK message from SIP application server to the media server.

In addition to making development more difficult, M*ML cannot easily be tested for stability. Test Driven Development (TDD) is a common practice for exercising the functional tests and validating the health of a SIP application along the development. In TDD, the SIP endpoints that directly interact with the SIP application server are substituted for mock ones. So, instead of conducting manual tests with a real caller SIP User Agent (UA), a real callee UA, and a real media server, TDD substitutes these elements for a mock-Caller-UA, a mock-Callee-UA and a mock-media server. These mock elements are a SIP stack (usually using the NIST stack) and provide the advantage over the real elements, because the mock ones can be controlled via an Application Programming Interface (API) and orchestrated via the different test cases to accomplish the different test scenarios. Thus, manual interaction can be reduced or avoided and any developer can trigger the tests. But the fact that the media server works with M*ML makes this TDD approach extremely difficult, and, as a general rule, applications that use M*ML do not go through this described TDD methodology to exercise its functional tests.

Notwithstanding the above drawbacks, M*ML is useful in that the whole application is developed and run in the SIP application server only. There is no specific development needed in the media or web servers. This requires less skill-sets from developers (as they don't need to develop web pages for example), and as a consequence, it facilitates development because it does not introduce integration points between different teams that use different technologies.

The second alternative that is currently used to provide IVR capabilities in a SIP environment is the utilization of a VoiceXML enabled media server. VoiceXML, or simply VXML, is a scripting language that describes what IVR commands to execute. As opposed to M*ML, the VoiceXML is generated by the web server and not by SIP application server. However, the media server interprets the VoiceXML.

To request an IVR capability, the SIP application server sends an INVITE message to the media server passing in a SIP header a Hypertext Transfer Protocol (HTTP) Uniform Resource Locator (URL) that points to the web server that will generate the VoiceXML page. Once the media server gets the INVITE, it will extract this HTTP URL and issue the HTTP request to the web server, which will then generate the VoiceXML and return it back to the media server to be interpreted and run.

Similar to the first currently available alternative, VoiceXML is not without its share of drawbacks. More specifically, though VoiceXML is a standard language defined by the W3C, different media servers might support different versions of the standard. Also, XML-based languages inherit the "X" capability from the word "XML." This is what makes them eXtensible. This can be seen as good thing for data structures. However, the value for a language such as VoiceXML is questionable, since the different media servers are allowed to create custom tags and extend the existing ones. All of these different versions and extensions make VoiceXML have different flavors; meaning that a VoiceXML that is generated by a web server and runs on media server-A cannot be guaranteed to run on media server-B.

Another drawback to the VoiceXML alternative is that the application hosted in the SIP application server is responsible only for the SIP signaling and for instructing the media server where to get the VoiceXML pages from. The actual logic of the IVR handling (what to play and collect and how to handle the IVR results) is coded in the web server. This makes application integration harder as developers are split into two expertise domains, and it is harder to trace issues due to this split as well. There is also the need for the developers to have specialized knowledge to code using both SIP servlets (on the SIP application server side) and VoiceXML (on the web server side).

Additionally, VoiceXML lacks a callback mechanism. As an example, assume that the IVR needs to collect an extension and the SIP application server needs to get a hold of this collected extension in order to do some SIP signaling on it. Although the media server has an open SIP dialog with the SIP application server and although it is the media server that is running the VoiceXML and the media server has the collected digits, there is no formal way for passing that input back to the SIP application server. This forces the developers to be responsible for coding their own mechanisms to accomplish such callback tasks.

VoiceXML may also be frustrating to code. This is so because it is not intuitive to most developers to combine server side commands with the VoiceXML tags. Additionally, there is no syntax checking because this step happens when using an API such as Java (meaning, if the developer made a typo graphical error using VoiceXML he/she would not know until the application is run, which is time consuming). Most frustrating is if the developer tries to run the application and there is a problem, then the difficulty of tracing problems arises. Often error messages are not meaningful and fail to pin point the problem.

VoiceXML is not, of course, without its own advantages. For example, as opposed to M*ML, there are more media servers that are VoiceXML-enabled than M*ML-enabled. Another strength of VoiceXML is that, due to the "Split Application Logic" explained above, the application hosted in the SIP application server is not actually in control over what IVR interactions are run. Rather, the web pages are hosted in the web server, which is also the element that generates the VoiceXML. Thus, the web server is the one in control of the IVR. This results in a very simple SIP signaling paradigm between the SIP application server and the media server, which ultimately means less corner cases.

SUMMARY

Embodiments of the present invention propose an alternative way of providing IVR capabilities to a SIP endpoint that has its SIP signaling controlled by an application running in a SIP application server. By providing the SIP application server with the ability to control the SIP signaling for IVR functions, a number of advantages over the prior art can be achieved. More specifically, a simple-to-use API can be obtained, the solution can be portable and adaptable to run in different media servers, light SIP signaling can be achieved, testing can be easy to implement, and development can be performed in a central component (i.e., the SIP application server).

The above described drawbacks in the current SIP-based IVR technology can be addressed by various embodiments and configurations of the present invention. The present invention is directed generally to a system and method whereby a SIP application server is provided with the ability to control SIP signaling during IVR operations. The method generally comprising:

receiving, at a Session Initiation Protocol (SIP) application server, a first SIP message from a SIP User Agent (UA);

determining that an Interactive Voice Response (IVR) message is to be sent to the SIP UA;

generating a second SIP message containing commands to transmit the IVR message to the SIP UA; and transmitting the second SIP message from the SIP application server to a media server.

In accordance with at least some embodiments of the present invention, a SIP IVRObject is provided that enables the SIP application server to control the SIP signaling. To allow an application running on the SIP application server to make use of this IVRObject, a two-part installer can be run on the SIP application server. Namely, a SIP Application Server IVRObject Installer can be run on the SIP application server and on the web server a web server IVRObject Installer can be run.

The SIP application server IVRObject Installer can be used to add an "IVRObject SIP application server Framework" to the SIP application server. This framework may generally comprise an "IVRObject API" and an "IVRObject API Impl."

"The WebServer IVRObject Installer" can add the "IVRObject VoiceXML Generator", "IVRObject Callback", "IVRObject VoiceXML Flavor Plugin", and the "IVRObject Generic Atomic Web Pages Templates" to the web server.

Once the installers are in place and properly configured, the application on the SIP application server can make use of the IVRObject. In accordance with at least some embodiments of the present invention, the application will need only to be coded in the SIP application server component.

The API can allow the application to be developed in the SIP application server to interact with the IVRObject framework that will provide the IVR functionality. This API is called the "IVR Object API", and its implementation (the "IVRObject API Impl") is responsible for the interaction with the rest of the "IVRObject WebFramework" that resides in the web server.

In accordance with at least some embodiments of the present invention and from the application's perspective, the application will need only to interact with the IVRObject API to request the atomic IVR operations (play, collect, record). The remainder of the IVR functionality works transparently to the application. Moreover, the developer does not need to worry about including/coding: a) the communication between the "IVRObject WebFramework" and the "IVRObject SIPAS Framework"; b) the generation of the VoiceXML via the usage of the "IVRObject Generic Atomic Web Page Templates"; and c) the built in callback mechanism.

Based on observations that any IVR application can be broken down into 3 atomic operations (play/collect/record), what makes an IVR application specific/unique is how these operations are combined. It is thus one aspect of the present invention to provide the SIP/IVR framework with a way to provide for responding to these atomic operations. In accordance with at least some embodiments of the present invention, the control of what atomic operations should be invoked is done in the SIP application server by the application.

In one embodiment of the present invention, the web server that hosts the files which generate the VoiceXML are totally generic (meaning: the "IVRObject WebFramework" is totally application independent), and no application developer needs to see them or make changes to them, or even know they exist. It is all part of the IVRObject framework that is available to the developer, and accessible on the SIP application server via a simple and easy to use "IVRObject API."

It may also be possible for the "IVRObject WebFramework" to make use of specific pluggable VoiceXML implementations for each VoiceXML flavor that needs to have it supported. This particular element may include the "IVRObject VoiceXML Flavor Plugin" (as different media servers have its VoiceXML browsers that support different VoiceXML flavors). But also note that though different plugins may be attached to the framework, the application that is developed in the SIP application server can be 100% the same meaning that no line of code needs to be changed on the application if the media server vendor is changed. This means that it may be required to have the media server include a VoiceXML browser.

In comparison to the weaknesses of M*ML, the IVRObject according to certain embodiments of the present invention is not that difficult to parse/generate. This is so because there is no parsing needed from an application developer. Moreover, the IVRObject is significantly more portable since it utilizes the VoiceXML under the hood, and there are more media servers that support VoiceXML than M*ML. Plus, embodiments of the present invention provide a mechanism for transparently dealing with the different VoiceXML flavors via the "IVRObject VoiceXML Flavor Plugin."

As an additional benefit, embodiments of the present invention do not rely on INFO messages for providing IVR capabilities, as the VoiceXML is built on the web server and run by the media server. And the invention also provides a mechanism for grouping the related IVR atomic operations to minimize the signaling traffic between elements.

Yet another benefit provided by embodiments of the present invention is the ease with which the application can be tested. More specifically, TDD may be used to test/troubleshoot the application before it is installed in the field. In accordance with at least one embodiment of the present invention, the "IVRObject API Impl" could be replaced with a "IVRObject API Test Impl" to abstract the web server and have its callback managed by the test driver to simulate different user's input. The different SIP end points around the SIP application server could also be replaced with mock ones. This whole strategy allows the application to be tested programmatically (automated testing) for different functional scenarios, with no need to be changed in any way: as the "IVRObject API" is not changed.

While embodiments of the present invention overcome the disadvantages associated with M*ML, they also provide the ability to centrally develop an application on the SIP application server. This means that the IVRObject can also provide the advantages associated with M*ML, namely central development.

Similarly, embodiments of the present invention overcome the deficiencies of the VoiceXML implementation. For example, the "IVRObject VoiceXML Flavor Plugin" can be used to accommodate different Voice XML flavors. Additionally, since the application resides on the SIP application server only, split application logic is not a concern.

With at least some embodiments of the present invention, the lack of callback functionality is no longer a problem, as a built-in callback mechanism may be provided via the usage of the "IVRObject Callback." This particular object may be transparent to the developer of the application. Moreover, since the use of VoiceXML can be implemented by generation, the developer of the application does not necessarily need to know that VoiceXML is being used at all.

Again, embodiments of the present invention provide the strengths of VoiceXML while overcoming many of its deficiencies. This provides a superior way to support IVR functionality in a SIP environment.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any computing application in which it is desirable to provide IVR capabilities.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
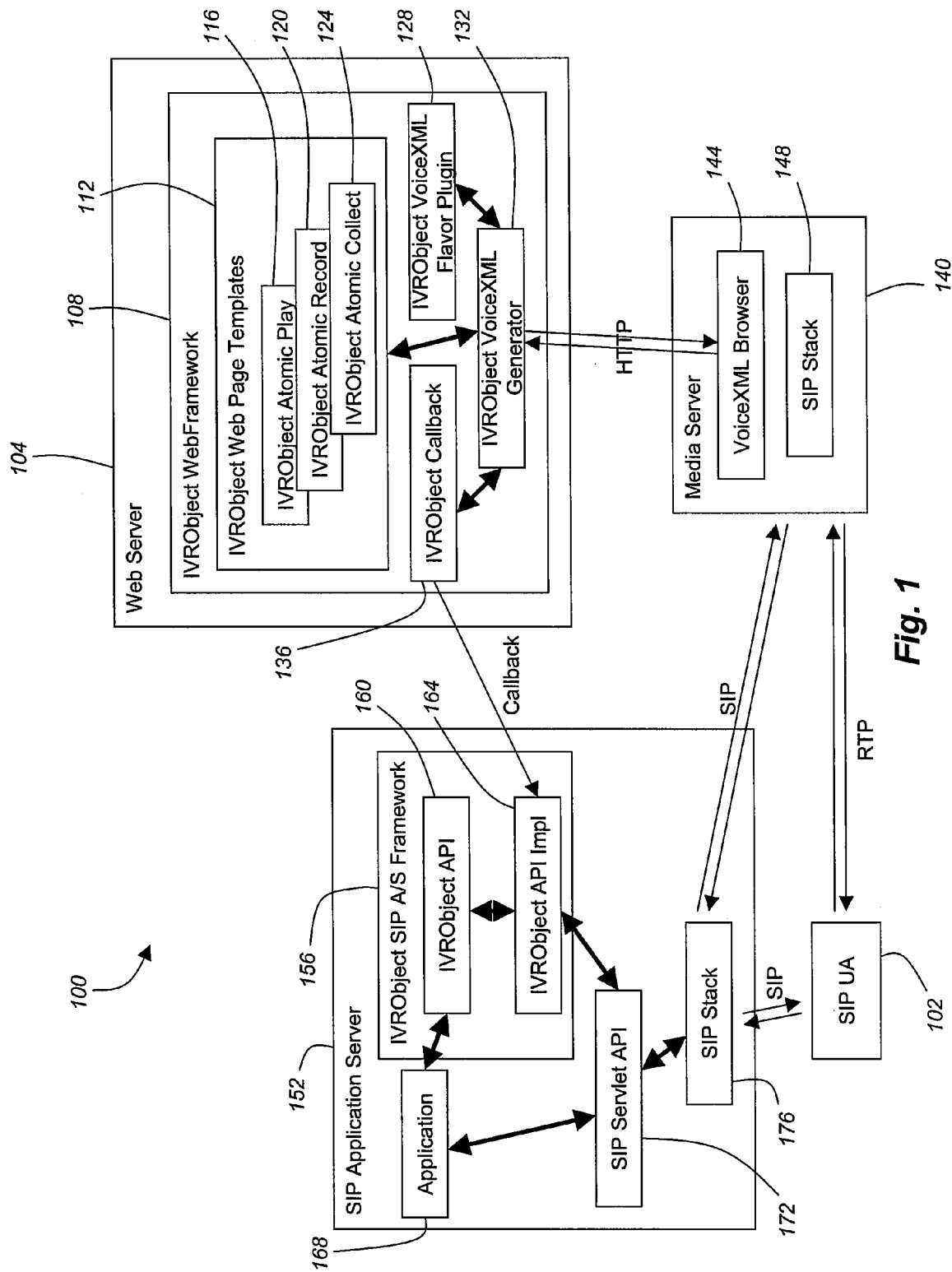
FIG. 1 is block diagram depicting aspects of IVR communication system in accordance with at least some embodiments of the present invention.

Referring now to FIG. 1, an exemplary communication system 100 will be described in accordance with at least some embodiments of the present invention. The communication system 100 may be used to provide a SIP User Agent (UA) 102 with SIP functionalities via the use of SIP signals. Additionally, certain components in the communication system 100 may be utilized to provide IVR services to the SIP UA 102 such as: a) playing a prompt to the SIP UA 102; b) collecting DTMF input from the SIP UA 102 via the phone keypad; and c) recording the SIP UA 102 audio/voice input into a file. Three components that may be provided in the communication system 100 to support such IVR functions include a web server 104, a media server 140, and a SIP application server 152.

The SIP application server 152 may comprise the logic to support SIP functionality of the SIP UA 102 via a SIP application 168 as well as logic to support IVR functionality that is provided to the SIP UA 102. The IVR functionality logic is controlled primarily by an IVRObject SIP application server ("A/S") Framework. Each of these logical components (i.e., the application 168 and the IVRObject SIP A/S Framework 156) may be capable of causing SIP messages to be sent from the SIP application server 152. Transmission of SIP messages from the SIP application server 152 may be facilitated by a SIP servlets API 172 and a SIP stack 176. These two components can cooperatively be used to format SIP messages for transmission from the SIP application server 152. The application 168 may also be adapted to process SIP messages received at the SIP application server 168 (e.g., from the SIP UA 102 or from the media server 140).

In accordance with at least some embodiments of the present invention, the IVRObject SIP AIS Framework 156 may comprise an IVRObject API 160 and an IVRObject API Impl 164 to support the IVR logic decisions (e.g., whether transmission of a message to the SIP UA 102 is necessary, whether DTMF data collection from the SIP UA 102 is necessary, and/or whether audio/voice data collection from the SIP UA 102 is necessary) made by the application 168 and supported by the IVRObject SIP A/S Framework 156. The IVRObject API 160 may provide the application 168 with an easy to use API for requesting IVR functionality. Thus, if the application 168 determines that an IVR function should be implemented, then the application 168 may send a request for the determined IVR function to the IVRObject API 160. The IVRObject API Impl 164, on the other hand, may be used as the implementation of the IVRObject API 160. Therefore, when a request for IVR functionality is received at the IVRObject API 160 from the application 168, the IVRObject API 160 may utilize the IVRObject API Impl 164 to generate a request for an IVR message that is to be transmitted from the SIP application server 152 to the media server 140 (e.g. via the SIP servlets API 172 and SIP stack 176).

The media server 140 may be adapted to communicate with the SIP application server 152 via SIP messages. The translation and formatting of such SIP messages may be facilitated by a SIP stack 148 provided on the media server 140. The media server may also be capable of streaming audio and/or video messages to the SIP UA 102 via an RTP connection, for example. The media server 140 provides the logic to interpret IVR commands received from the SIP application server 152 and then execute the appropriate function based on its interpretation of the IVR commands. For example, the media server 140 may be adapted to generate the appropriate prompts for playing to the SIP UA 102. Furthermore, the media server 140 may be adapted to collect and/or record inputs (e.g., DTMF, audio/voice streams, etc.) from the SIP UA 102.

In accordance with at least some embodiments of the present invention, when the media server 140 determines that a message is to be played to the SIP UA 102, the media server may utilize a VoiceXML browser 144 to retrieve the appropriate VoiceXML file from the web server 104. The media server 140 may send such requests for VoiceXML files to the web server 104 via an HTTP message.

The web server 104 may include an IVRObject VoiceXML generator 132 that is capable of receiving and processing requests for VoiceXML files. The IVRObject VoiceXML generator 132 may control the web server 104 operations in connection with generating and providing a VoiceXML message back to the media server 140. The IVRObject VoiceXML generator 132 may also be capable of requesting multiple atomic operations that are to be included in a single generated VoiceXML message. For example, if the VoiceXML browser 144 issues a request for two different messages (e.g., a welcome message and a please enter user account number message) that are to be included in a single message played to the SIP UA 102, then the IVRObject VoiceXML generator 132 may be adapted to build a VoiceXML message that includes all of the requested atomic messages. The IVRObject VoiceXML generator 132 may be one of several other elements included in an IVRObject WebFramework 108 that is stored on the web server 104. Other elements that may be provided in the IVRObject WebFramework 108 include, but are not limited to, a collection of IVRObject generic atomic web page templates 112, an IVRObject Callback 136, and an IVRObject VoiceXML Flavor Plugin 128. The types of templates that may be stored in the IVRObject Web Page Templates 112 are an IVRObject Atomic Play 116, an IVRObject Atomic Record 120, and an IVRObject Atomic Collect 124. Each of these templates may be used to generate an IVR message and/or execute an IVR function from the media server 140. The IVRObject generic atomic web page templates 112 may provide template tags for the IVR atomic operations such as play, collect, and record.

In accordance with at least some embodiments of the present invention, the IVRObject VoiceXML generator 132 may utilize the IVRObject VoiceXML Flavor Plugin 128 to adapt the VoiceXML file provided to the media server 140 to a specific VoiceXML flavor for compatibility with the media server 140. This is particularly useful since different media servers developed by different providers may require different formats of VoiceXML files.

The IVRObject Callback 136 is operable to inject VoiceXML hooks into the VoiceXML file generated by the IVRObject VoiceXML generator 132. The hooks are transmitted back to the media server 140 as part of the VoiceXML file. The hooks may include a command that causes the media server 140 to issue a subsequent HTTP request back to the web server 104, and more particularly the IVRObject Callback 136 when a particular IVR operation has been executed (e.g., an IVR message has been played or information has been collected from the user) by the media server 104. Upon receiving the subsequent HTTP request from the media server 140, the IVRObject Callback 136 may issue a callback notification message that is transmitted to the IVRObject API Impl 164. This allows the SIP application 168 to know that the atomic IVR operation has been executed by the media server 140.

Figure 2:
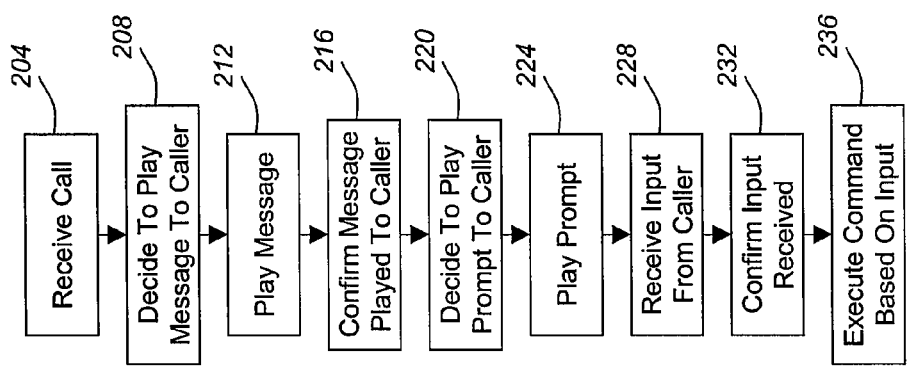
FIG. 2 is a flow diagram depicting an exemplary method of providing IVR functionality to a received call in accordance with at least some embodiments of the present invention.

Referring now to FIG. 2, an exemplary method of providing IVR functionality to a SIP UA 102 will be described in accordance with at least some embodiments of the present invention. The method is initiated when a call is received (step 204). More particularly, a SIP INVITE message transmitted from the SIP UA 102 may be received at the SIP application server 152. In response to receiving the SIP INVITE message, the application 168 determines that an IVR-type message should be played to the caller and thus provided to the SIP UA 102 (step 208). Upon making this determination, the application 168 initiates the IVR Object SIP A/S Framework 156 to send a SIP message to the media server 140 requesting that the IVR message be provided to the SIP UA 102. The media server 140 then retrieves the appropriate message from the web server 104 and streams the message to the SIP UA 102 (step 212).

After the message has been played to the caller, the media server 140 initiates transmission of a confirmation callback message to the SIP application 168 indicating that the message has been successfully played for the caller (step 216). When the SIP application 168 receives such confirmation, the application 168 may make a subsequent determination to play an IVR-prompt to the caller (step 220). Upon making this determination, the application 168 initiates the IVR Object SIP A/S Framework 156 to send a SIP message to the media server 140 requesting that a prompt be played and user input be collected from the SIP UA 102. The media server 140, in response to receiving the prompt request, generates a prompt message (with the help of the web server 104) and provides the prompt message to the SIP UA 102 (step 224). After the prompt has been played, the media server 140 waits for and receives input (e.g., DTMF and/or voice) from the caller (step 228). When the input is received, the media server 140 sends confirmation to the SIP application 168 (e.g., via the IVRObject Callback 136 on the web server 104) (step 232). Based on receiving the confirmation that a particular input has been received, the application 168 then makes a determination as to what command or action should be executed (step 236). As an example, the application 168 may decide to transfer the caller to a particular extension. Alternatively, the caller may be forwarded to a contact center agent if the IVR is being deployed in a contact center environment. As still another alternative, the application 168 may decide to send another message to the user via the media server 140.

Figure 3A:
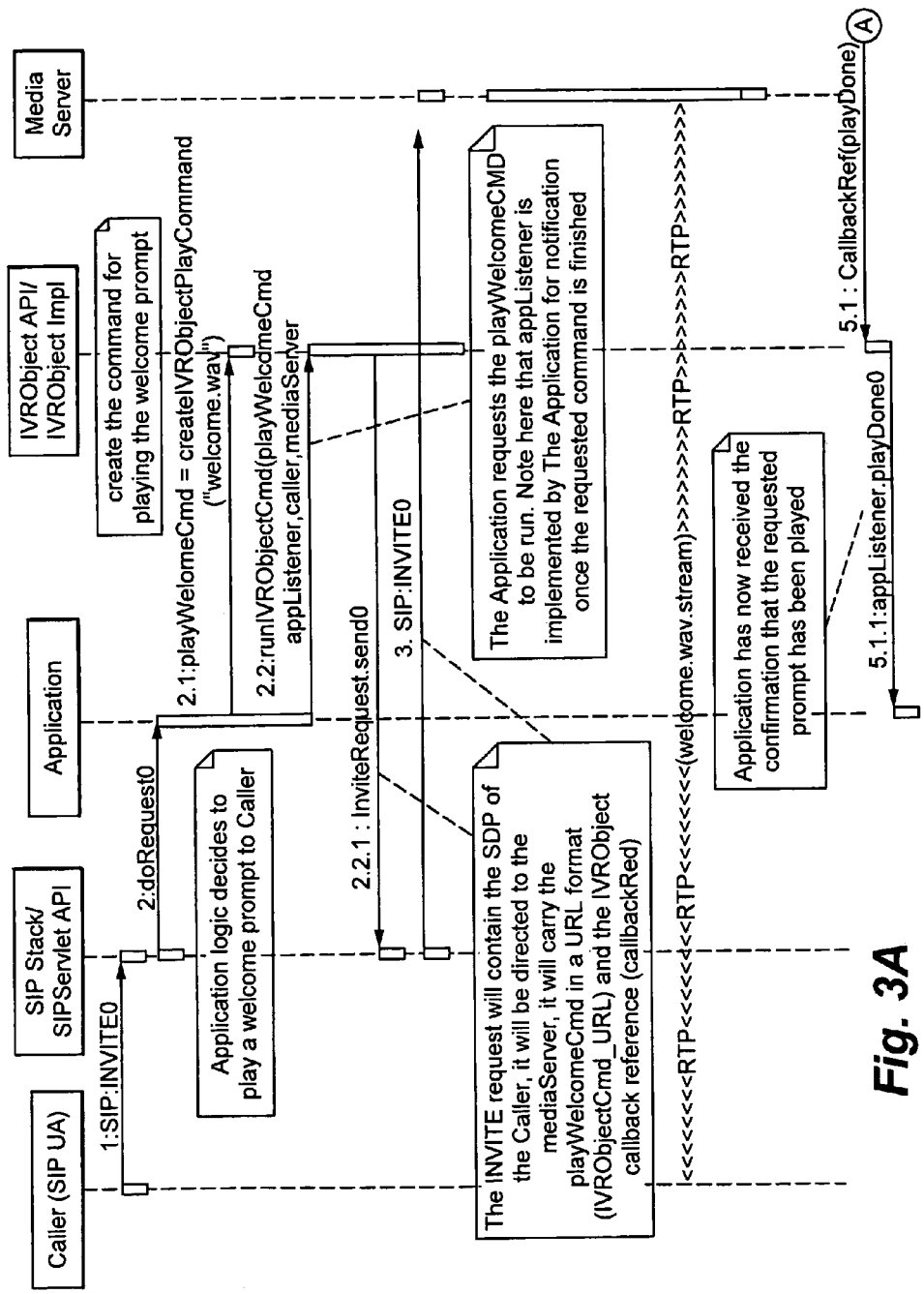
FIGS. 3A and 3B are a call-signal flow diagram depicting an exemplary method of providing some IVR functionality to a received call in accordance with at least some embodiments of the present invention.
Figure 3B:
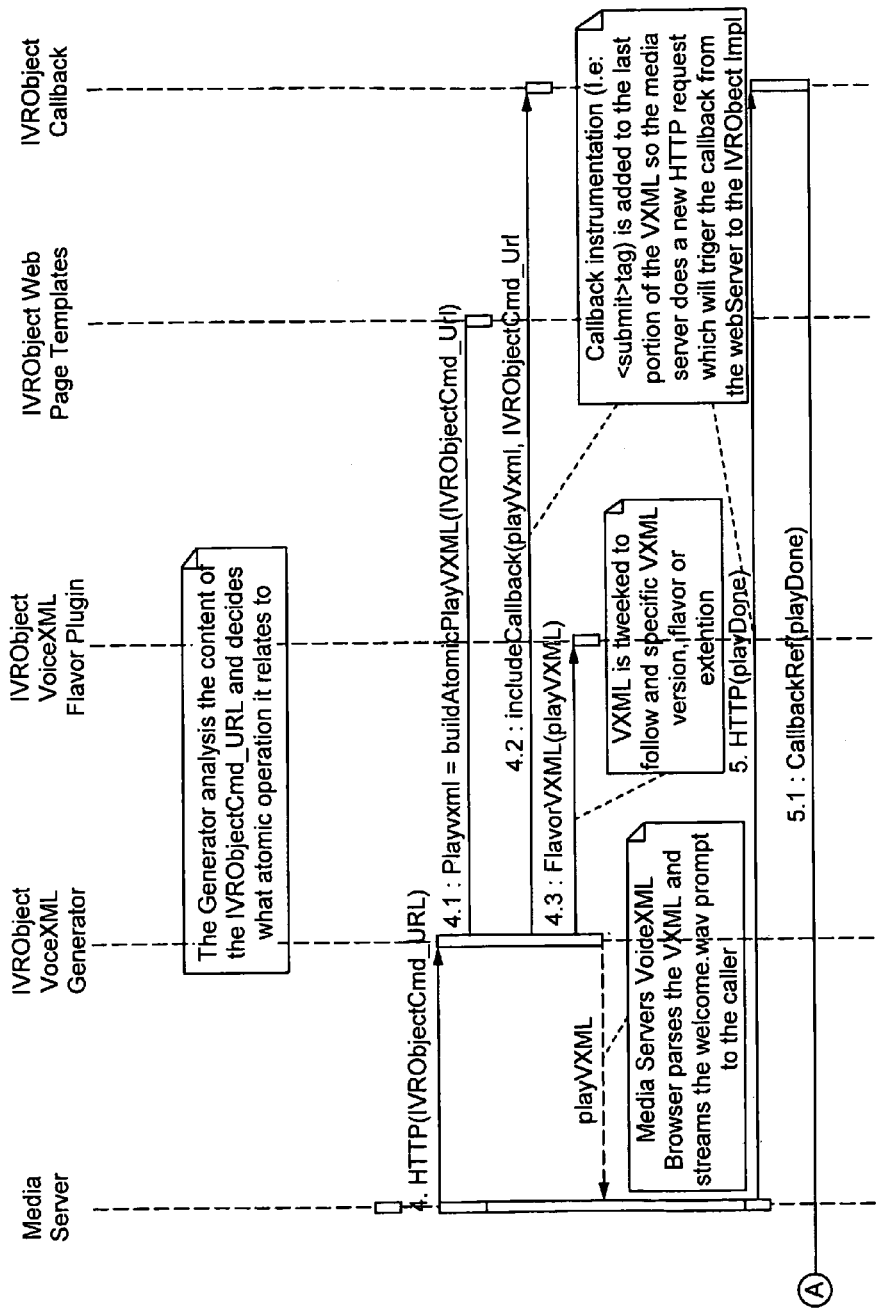

With reference now to FIGS. 3A and 3B and 4A and 4B, a more detailed explanation of the signaling flows used to provide IVR functions will be described in accordance with at least some embodiments of the present invention. As can be seen in FIGS. 3A and 3B, the method begins when a SIP INVITE message is received at the SIP Stack 176/SIP Servlet API 172 (step 1). More specifically, the caller dials into SIP application server 152 using their SIP UA 102, and the SIP INVITE sent by the SIP UA 102 is handled by the SIP Stack 176 and Sip Servlet API 172.

Upon receiving the SIP INVITE message, the application 168 is invoked via a doRequest( ) command transmitted from the SIP Servlet API 172 (step 2). The doRequest( ) generated and transmitted by the SIP Servlet API 172 notifies the application 168 of the incoming SIP requests. Based on this notification, the application 168 utilizes its business logic or rule set to decide to play a welcome prompt to the caller. After this determination has been made by the application 168, the application 168 invokes a "createIVRObjectPlayCommand" that is defined in the IVRObject API 160 (step 2.1). This particular command defines what prompt to play (e.g., "welcome.wav") to the caller. This command reference is named arbitrarily by the application 168 as: playWelcomeCmd. Thereafter, the application invokes the "runIVRObjectCmd" that is also understood by the IVRObject API 160 (step 2.2). The runIVRObjectCmd requests that the previously created playWelcomeCmd to be run. Along with the playWelcomeCmd, additional parameters are passed to the IVRObject API 160 in the runIVRObjectCmd. The additional parameters may include, but are not limited to, an appListener parameter (i.e., a parameter that defines an instance of a listener that implements the IVRObjectListener, which allows the application 168 to be notified that the request command was executed by the media server 140), a caller parameter (i.e., a parameter that contains the caller details including its Session Description Protocol (SDP) that is to be sent to the media server 140), and a mediaServer parameter (i.e., a parameters that identifies the address of the media server 140 that is to receive the command).

The method continues with the IVRObject API Impl 164 considering all the parameters specified in the previous item and constructs a new INVITE message using the SIP Servlet API 172 (step 2.2.1). This message will serve as a request that includes the mediaServer address as the reqURI target. The request payload will carry the caller SDP and the request will have a VoiceXML parameter that is added to the reqURI with some generically named content. As an example, the content may be named "IVRObjectCmd_URL. The request may also include the callback reference (i.e., callbackRef) that is a hook which is passed all the way to the web server 104 via the media server 140, so that the web server 104 can call the IVRObject Impl 164 back to report that the requested IVR operations (i.e., atomic operations) have been executed. It should also be noted that passing the VoiceXML parameter in the reqURI provides a way for informing the media server 140 of the URL of the web server that will be used to generate the VoiceXML script which will, in turn, be interpreted and run by the media server 140. After receiving the request from the IVRObject API Impl 164, the SIP application server 152, via its SIP Servlet API 172 and SIP Stack 176, sends the formatted SIP INVITE message to the media server 140 (step 3).

Upon receiving the SIP INVITE message, the media server 140 follows its expected behavior and first extracts the VoiceXML parameter from the reqURI. Based on the value of this parameter, the media server 140 issues an HTTP request to the web server 104 for this URL that will allow the media server 140 to get back a VoiceXML that it can interpret ant run (step 4). The IVRObject VoiceXML generator 132 receives the HTTP request and interprets the content of the IVRObjectCmd_URL to invoke the different helper components that will be used to build the VoiceXML script. In other words, the IVRObject VoiceXML generator 132 determines what atomic IVR operations will be needed to fulfill the HTTP request.

The IVRObject VoiceXML generator 132 continues by requesting the IVRObject Atomic Play 116 (from the IVRObject generic atomic web page templates 112) in order to start adding the required tags to form the play VoiceXML script (step 4.1). Then, the IVRObject VoiceXML generator 132 requests the IVRObject Callback 136 to include, in the play VoiceXML script, the required VoiceXML tag that will force the media server 140 to issue a subsequent HTTP request back to the web server 104 reporting the results of the VoiceXML run (step 4.2). The IVRObject VoiceXML generator 132 will next request the IVRObject VoiceXML Flavor Plugin 128 to configure the current content of the play VoiceXML (that has been built) to have the VoiceXML script comply with the flavor/version of VoiceXML supported by the requesting media server 140 (step 4.3). At this point, the VoiceXML generator 132 has successfully built the VoiceXML script based on the HTTP request; thus, it forwards the VoiceXML script back to the media server 140.

When the media server 140 receives the VoiceXML script, the script is interpreted and run. At this point the content of the welcome.wav prompt is streamed to the SIP UA 102 via an RTP session, for example. The RTP session may have already been established between the media server 140 and the SIP UA 102 via traditional SIP signaling (e.g., via the use of INVITE, OK, ACK, and BYE messages). Such SIP signaling used to establish an RTP connection between two endpoints is relatively well known in the art and is, therefore, not discussed here for clarity and to highlight the SIP signaling used for IVR purposes in accordance with at least some embodiments of the present invention.

Once the welcome.wav is played, the VoiceXML Browser 144 will run the last tag in the playVoiceXML script. This last tag instructs the media server 140 to issue a new HTTP request that carries the parameters indicating that the prompt was played and the callbackRef (i.e., the address of the SIP application server 152). This new HTTP request is then transmitted to the IVRObject Callback 136 on the web server 104 (step 5).

After the IVRObject Callback 136 receives the HTTP request, the IVRObject Callback 136 uses the callbackRef to reach the IVRObject API Impl 164 and report the completion of the requested command (step 5.1). The IVRObject API Impl 164 utilizes the application listener implementation of the IVRObjectListener and reports receipt of the callback to the application 168 (step 5.1.1). This causes a "playDone( )" method to be called which completes the reporting to the application 168. At this point, the application 168 knows that the welcome.wav has been played and can make subsequent call handling decisions.

Figure 4A:
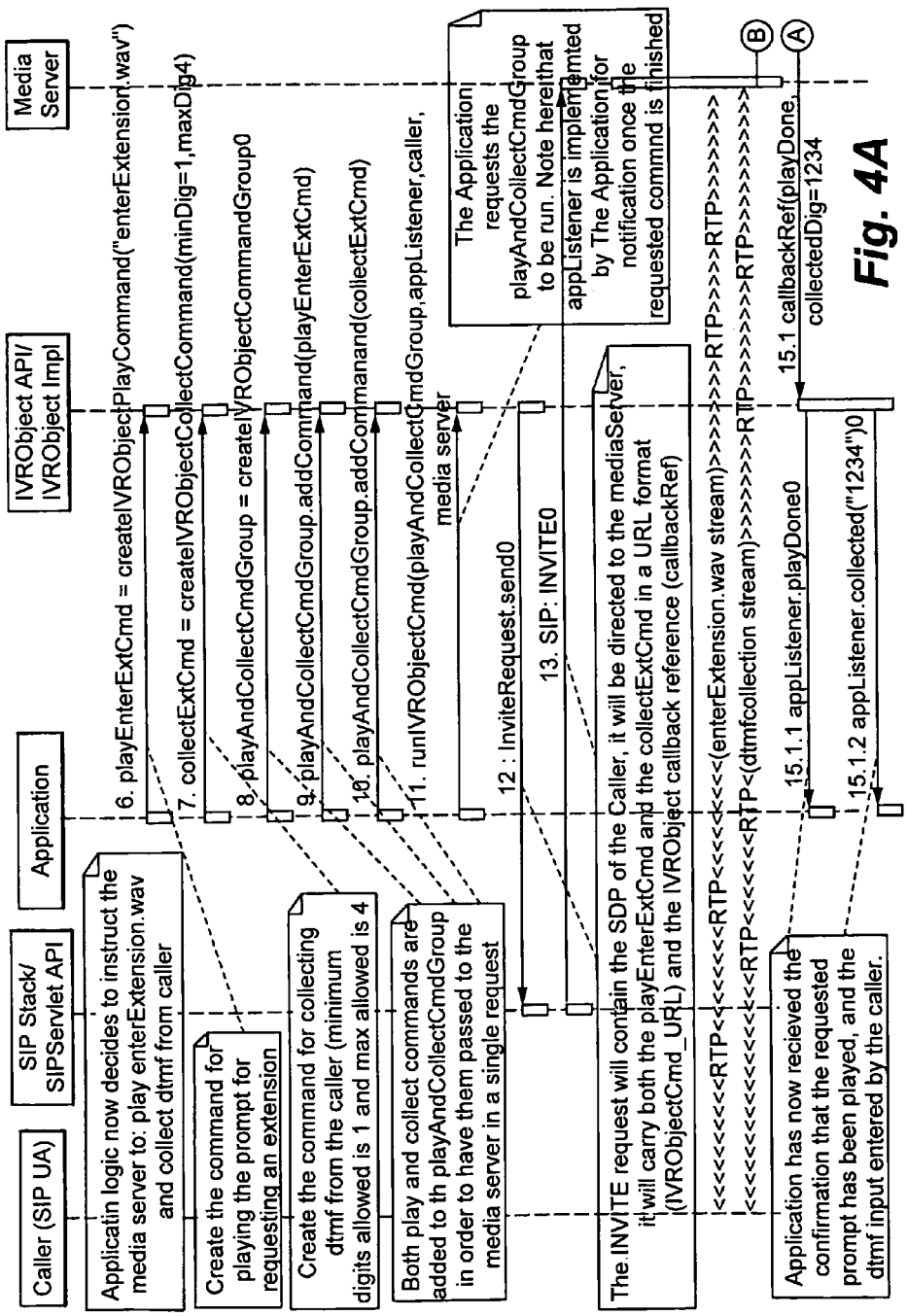
FIGS. 4A and 4B are a continuation of the call-signal flow diagram of FIGS. 3A and 3B.
Figure 4B:
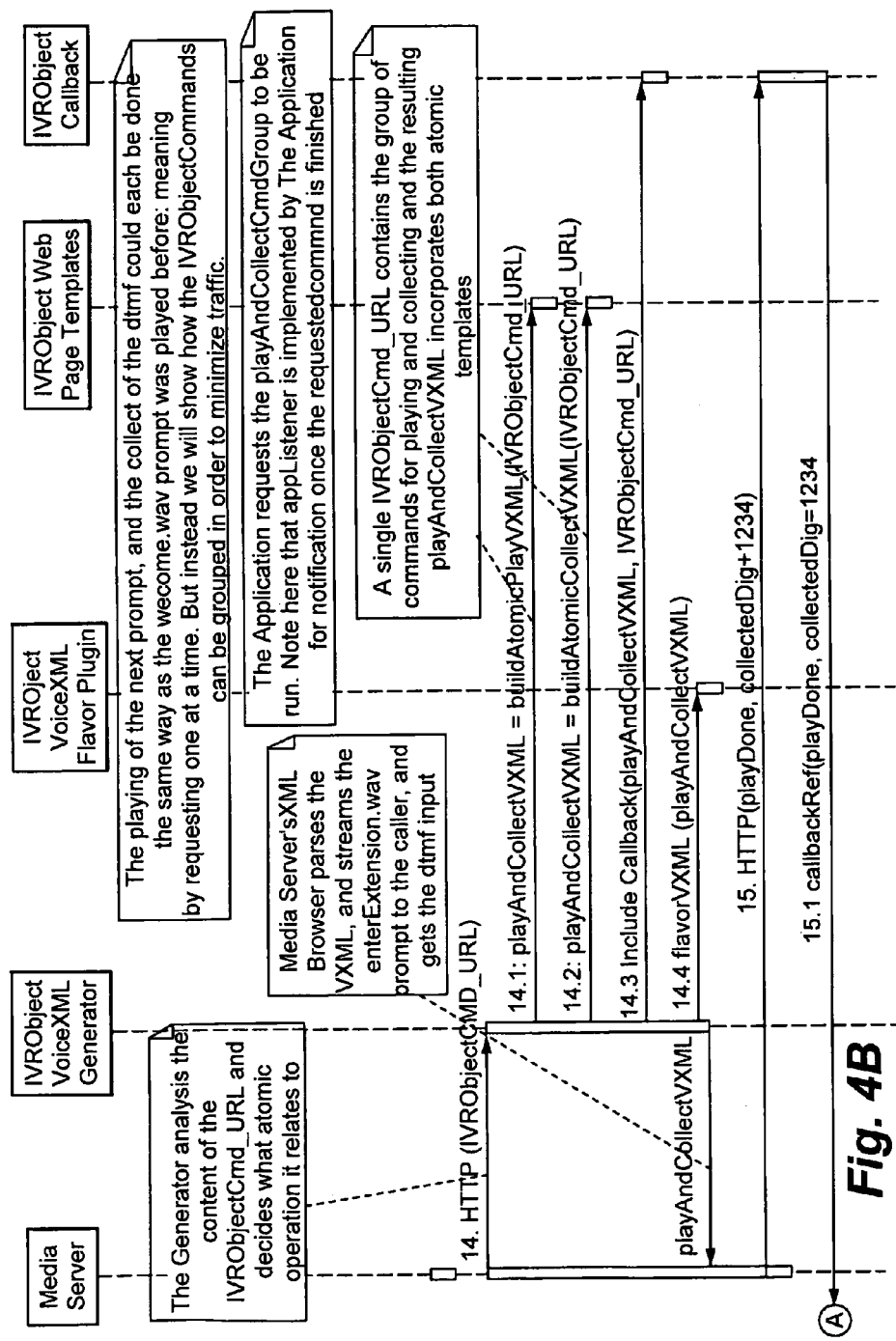

As can be seen in FIGS. 4A and 4B, the application 168 may continue by determining that a second set of instructions should be issued to the media server 140. More specifically, the application 140 may decide to play an enterExternsion.wav and collect DTMF from the caller. The requests used to initiate playing of this next prompt and collection of DTMF could be done in a similar fashion to the way the welcome.wav prompt was played before (i.e., by singular requests issued one at a time). However, in accordance with at least some embodiments of the present invention, the IVRObjectCommands can be grouped together in order to minimize signal traffic.

Thus, the application 168 may invoke the "createIVRObjectPlayCommand" method defined in the IVRObject API 160 to define what prompt to play (step 6). The command reference may be named arbitrarily by the application 168 as: playEnterExtCmd.

The application may also invoke the "createIVRObjectCollectCommand" method defined in the IVRObject API 160 (step 7). The collect command may include a request to collect DTMF input from the caller. The application 168 may also request, for example, that the minimum digits allowed from the caller is one and the maximum allowed is four. This command reference may be named arbitrarily by the application 168 as: collectExtCmd.

The play and collect commands may then be grouped into a single command (step 8). More particularly, the application 168 may invoke the "createIVRObjectCommandGroup" method defined in the IVRObject API 160 to create a holder for a sequence of commands. Using a group command provides the developer with the ability to chain several related atomic operations into one logical unit. Additionally, the group command helps minimize the traffic required as all of the commands will be passed to the media server 140 as a bunch instead of one at a time. This create group reference may be named arbitrarily by the application 168 as: playAndCollectCmdGroup.

Thereafter, the play and collect commands are added to the playAndCollectCmdGroup (steps 9 and 10). This causes the atomic operations to be added to the group command. Once the group command has been constructed, the application 168 invokes the "runIVRObjectCmd" method defined in the IVRObject API 160 (step 11). In other words, the application 168 requests that the group command is run. In addition to sending this request to the IVRObject API 160, the application 168 also passes a number of parameters to the IVRObject API 160 to further define the operation of the group command. More particularly, the parameters passed to the IVRObject API 160 may include the appListener parameter, the caller parameter, and the mediaServer parameter.

Upon receiving the request to run the group command as well as the appropriate parameters, the IVRObject API Impl 164 constructs a new SIP INVITE message using the SIP Servlet API 172 and the SIP Stack 176 (step 12). The SIP INVITE message is used as a request for the media server 140 to execute the play and collect IVR functions. The requesting message may contain the address of media server 140 in the reqURI target, the caller SDP in the payload, and a VoiceXML parameter in the reqURI that generally references the type of VoiceXML script that is desired. Again, the request may also include a callbackRef hook that is passed all the way to the web server 104 via the media server 140 so that the web server 104 can call the IVRObject API Impl 164 to report on the execution of IVR operations. It should also be noted that passing the VoiceXML parameter in the reqURI provides a way of letting the media server 140 know the web server 104 that will generate the VoiceXML script.

After the SIP INVITE message has been generated by the SIP Servlet API 172 and SIP Stack 176, the SIP INVITE message is transmitted to the media server 140 (step 13). Upon receipt of the INVITE message, the media server 140 will extract the VoiceXML parameter from the reqURI (i.e., the IVRObjectCmd_URL) and then issue an HTTP request to this URL from the web server 104 to get a VoiceXML script back for interpretation and execution (step 14).

Upon receipt of the HTTP request, the web server 104 will interpret the content of the IVRObjectCmd_URL and invoke the different helper components for building the playAndCollect VoiceXML script for the media server 140. As a first step, the IVRObject VoiceXML generator 132 will request the IVRObject atomic play 116 to add the required play tags that form the playAndCollect VoiceXML script (step 14.1). Next, the IVRObject VoiceXML generator 132 will request the IVRObject atomic collect 124 to add the required collection tags that form the playAndCollect VoiceXML script (step 14.2). The IVRObject VoiceXML generator 132 will then request that the IVRObject Callback 136 include a callback tag in the VoiceXML script (step 14.3). This callback tag will force the media server 140 to issue a subsequent HTTP request to the web server 104 reporting results of execution of the VoiceXML script. As a final building step, the IVRObject VoiceXML generator 132 will utilize the IVRObject VoiceXML Flavor Plugin 128 to adjust the format of the VoiceXML script to match formats accepted by the media server 140 (step 14.4). The generated VoiceXML script is then passed back to the media server 140 where it is interpreted and run. More specifically, an RTP session established between the media server 140 and the SIP UA 102 may be used to stream an enterExtension.wav prompt and then capture digits entered by the caller on the keypad of the SIP UA 102.

After the media server 140 has received the DTMF input from the SIP UA 102, the media server 140 will execute the last tag in the VoiceXML script, namely the callback tag (step 15). This causes the media server 140 to transmit a subsequent HTTP request to the web server 104, which carries parameters indicating that the prompt was played as well as parameters that identify the digits that were captured. The IVRObject Callback 136 will report these results to the IVRObject API Impl 164 on the SIP application server 152 (step 15.1). The IVRObject API 160 will then utilize its application's listener implementation and invoke its "playDone( )" method to indicate that the message has been played (step 15.1.1) and its "collected( )" method with the digits entered by the caller (step 15.1.2). Thus, the application 168 is made aware of all IVR functions executed by the media server 140 as well as the nature of the data provided by the caller. At this point, the application 168 logic can continue and make additional decisions as to how the call should be processed. For instance, the application 168 may decide to connect the caller with an extension corresponding to the entered digits.

Figure 5:
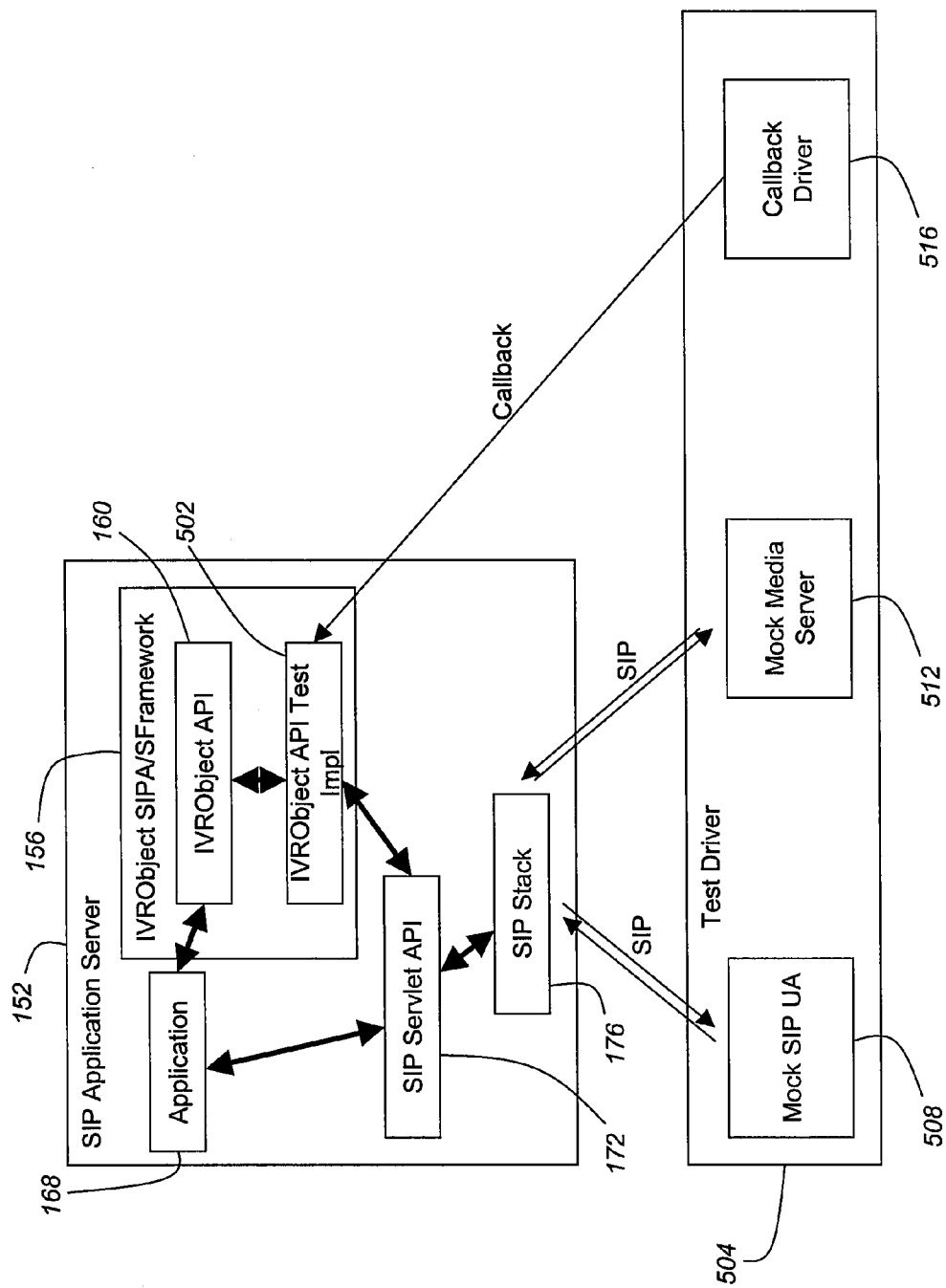
FIG. 5 is a block diagram depicting a testing architecture for testing the application on the SIP application server in accordance with at least some embodiments of the present invention.

With reference now to FIG. 5, an exemplary system that can be used for testing the application 168 will be described in accordance with at least some embodiments of the present invention. In accordance with at least some embodiments of the present invention, a testing system may include an IVRObject API Test Impl 502 that is used to replace the IVRObject API Impl 164. The replacement allows the IVRObject API Test Impl 502 to abstract the web server 104 and have its callback managed by a Test Driver 504 to simulate different user inputs. The test driver 504 may also include a Mock SIP UA 508, a Mock Media Server 512, and a Callback Driver 516. The components of the test driver 504 represent different SIP end points around SIP application server 152 that are replaced with mock ones. This whole strategy allows the application 168 to be tested programmatically (automated testing) for different functional scenarios, with no need for the IVRObject API 160 to be changed in any way.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for creating and using an interactive voice response object. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A Session Initiation Protocol (SIP) application server, comprising:
   a SIP application, executed by one or more processors, that supports SIP functions for a SIP User Agent (UA); and
   an Interactive Voice Response (IVR) Framework executed by the one or more processors that initiates IVR functions that are presented to the SIP UA, wherein the IVR Framework is controlled by the SIP application, wherein the IVR Framework interacts with a corresponding IVRObject WebFramework residing on a web server, wherein the IVRObject WebFramework injects Voice Extendable Markup Language (XML) hooks into a generated Voice XML file that is transmitted to a media server, wherein the interaction between the IVR Framework and the IVRObject WebFramework comprises receiving, at the SIP application server, a callback notification message from the web server indicating that the media server in communication with the web server has at least one of played an IVR message to a user and collected information from a user.

2. The SIP application server of claim 1, wherein the web server is different than the SIP application server in which the SIP application and IVR Framework are provided, wherein the callback notification message informs the SIP application that a requested IVR function has been executed at a media server, and wherein the IVR Framework comprises an Application Programming Interface (API) that receives commands from the SIP application and generate instructions representative of the received commands for transmission to the media server.

3. The SIP application server of claim 2, wherein the instructions are transmitted to the media server in a SIP INVITE message that includes Session Description Protocol (SDP) information associated with the SIP UA, a target address for the media server, and an identifier of the IVR message that is to be played to the user by the media server.

4. The SIP application server of claim 3, wherein the identifier comprises a tag that identifies a Voice eXtensible Markup Language (VoiceXML) template that is to be included in the VoiceXML file provided by the web server to the media server and executed by the media server.

5. The SIP application server of claim 4, wherein the VoiceXML file comprises at least one of a play, collect, and record template that, when executed by the media server, cause the media server to provide a message to the SIP UA, collect input from the SIP UA, and record input from the SIP UA, respectively.

6. The SIP application server of claim 1, wherein the IVR Framework requests transmission of a SIP message from the server to the media server that includes a command to transmit an IVR message from the media server to the SIP UA.

7. The SIP application server of claim 6, wherein the IVR message comprises a streaming message that includes at least one of audio and video content.

8. The SIP application server of claim 1, wherein the SIP application requests confirmation of execution of a first IVR function, wherein the IVR Framework generates the callback notification in response to receiving the request for confirmation from the SIP application, transmits the callback command to the web server which executes the callback command and, in response to executing the callback command, transmits the callback notification message to the SIP application server after the first IVR function has been executed by the media server.

9. The SIP application server of claim 1, further comprising:
   the web server, wherein the web server stores VoiceXML commands; and
   the media server retrieves VoiceXML commands from the web server and execute the retrieved VoiceXML commands to provide the IVR functions presented to the SIP UA.

10. The SIP application server of claim 1, wherein the web server is different than the SIP application server in which the SIP application and IVR Framework are provided, wherein the web server further comprises:
    a VoiceXML generator that builds the VoiceXML file from atomic VoiceXML templates; and
    a VoiceXML Flavor Plugin that adjusts a format of the VoiceXML file to allow the media server to properly understand and execute the VoiceXML file.

11. The SIP application server of claim 1, wherein the VoiceXML hooks include a command that causes the media server to issue a subsequent Hypertext Transfer Protocol (HTTP) request back to the web server when the at least one of the IVR message is played or the information is collected from the user.

12. A non-transitory computer readable medium having stored thereon instructions that, when executed, cause a processor to perform a method, the instructions comprising:
    instructions for a Session Initiation Protocol (SIP) application that supports SIP functions for a SIP User Agent (UA);
    instructions for an Interactive Voice Response (IVR) Framework that initiates IVR functions that are presented to the SIP UA, wherein the IVR Framework is controlled by the SIP application;
    instructions for an Interactive Voice Response (IVR) Framework that interacts with a corresponding IVRObject WebFramework residing on a web server;

instructions for the IVRObject WebFramework injecting Voice Extendable Markup Language (XML) hooks into a generated Voice XML file;

instructions to transmit the VoiceXML file to a media server, wherein the interaction between the IVR Framework and the IVRObject WebFramework comprises instructions to receive, at the SIP application server, a callback notification message from the web server indicating that the media server in communication with the web server has at least one of played an IVR message to a user and collected information from a user.

13. The non-transitory computer readable medium of claim 12, wherein the web server is different than the SIP application server in which the SIP application and IVR Framework are provided, wherein the callback notification message informs the SIP application that a requested IVR function has been executed at a media server, and wherein the IVR Framework comprises an Application Programming Interface (API) that receives commands from the SIP application and generate instructions representative of the received commands for transmission to the media server.

14. The non-transitory computer readable medium of claim 13, wherein the instructions are transmitted to the media server in a SIP INVITE message that includes Session Description Protocol (SDP) information associated with the SIP UA, a target address for the media server, and an identifier of the IVR message that is to be played to the user by the media server.

15. The non-transitory computer readable medium of claim 14, wherein the identifier comprises a tag that identifies a Voice eXtensible Markup Language (VoiceXML) template that is to be included in the VoiceXML file provided by the web server to the media server and executed by the media server.

16. The non-transitory computer readable medium of claim 15, wherein the VoiceXML file comprises at least one of a play, collect, and record template that, when executed by the media server, cause the media server to provide a message to the SIP UA, collect input from the SIP UA, and record input from the SIP UA, respectively.

17. The non-transitory computer readable medium of claim 12, wherein the IVR Framework includes instructions to request transmission of a SIP message from the server to the media server that includes a command to transmit an IVR message from the media server to the SIP UA.

18. The non-transitory computer readable medium of claim 17, wherein the IVR message comprises a streaming message that includes at least one of audio and video content.

19. The non-transitory computer readable medium of claim 12, wherein the SIP application requests confirmation of execution of a first IVR function, wherein the IVR Framework generates the callback notification in response to receiving the request for confirmation from the SIP application, transmit the callback command to the web server which executes the callback command and, in response to executing the callback command, transmits the callback notification message to the SIP application server after the first IVR function has been executed by the media server.

20. The non-transitory computer readable medium of claim 12, further comprising:
  instructions for storing VoiceXML commands on the web server; and
  instructions to retrieve VoiceXML commands from the web server and instructions to execute the retrieved VoiceXML commands to provide the IVR functions presented to the SIP UA.

* * * * *